United States Patent
Andrews

(10) Patent No.: US 9,207,730 B2
(45) Date of Patent: Dec. 8, 2015

(54) MULTI-LEVEL THERMAL MANAGEMENT IN AN ELECTRONIC DEVICE

(75) Inventor: Jonathan Jay Andrews, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1027 days.

(21) Appl. No.: 13/151,688

(22) Filed: Jun. 2, 2011

(65) Prior Publication Data
US 2012/0311357 A1  Dec. 6, 2012

(51) Int. Cl.
| | |
|---|---|
| *G06F 1/00* | (2006.01) |
| *G06F 1/26* | (2006.01) |
| *G06F 1/32* | (2006.01) |
| *G06F 1/20* | (2006.01) |

(52) U.S. Cl.
CPC ............ *G06F 1/206* (2013.01); *G06F 1/3203* (2013.01); *G06F 1/324* (2013.01); *Y02B 60/1217* (2013.01); *Y02B 60/1275* (2013.01)

(58) Field of Classification Search
CPC ......... G06F 1/206; G06F 1/303; G06F 1/324; Y02B 60/1217; Y02B 60/1275
See application file for complete search history.

(56) References Cited

U.S. PATENT DOCUMENTS

| | | | |
|---|---|---|---|
| 6,319,114 B1 | 11/2001 | Nair et al. | |
| 6,927,626 B2 | 8/2005 | Stanley | |
| 6,975,047 B2 | 12/2005 | Pippin | |
| 7,464,278 B2 * | 12/2008 | Cohen et al. | 713/320 |
| 8,788,866 B2 * | 7/2014 | Anderson et al. | 713/340 |
| 2001/0001880 A1 * | 5/2001 | Watts, Jr. | 713/322 |
| 2004/0014489 A1 * | 1/2004 | Miyachi et al. | 455/550.1 |
| 2005/0210905 A1 * | 9/2005 | Burns et al. | 62/259.2 |
| 2006/0082346 A1 * | 4/2006 | Nagasawa | 320/150 |
| 2007/0067136 A1 | 3/2007 | Conroy et al. | |
| 2008/0028778 A1 | 2/2008 | Millet | |
| 2009/0299543 A1 | 12/2009 | Cox et al. | |
| 2010/0094582 A1 | 4/2010 | Cox et al. | |
| 2010/0188136 A1 | 7/2010 | Baker et al. | |
| 2011/0154079 A1 * | 6/2011 | Dixon et al. | 713/323 |

(Continued)

FOREIGN PATENT DOCUMENTS

| | | |
|---|---|---|
| JP | 200428373 A | 10/2004 |
| JP | 2009506424 | 2/2009 |
| KR | 1020110016452 | 2/2011 |

OTHER PUBLICATIONS

PCT International Search Report and Written Opinion of the International Searching Authority for PCT/US2012/037577, mailed Sep. 27, 2012.

(Continued)

*Primary Examiner* — M Elamin
(74) *Attorney, Agent, or Firm* — Blakely, Sokoloff, Taylor & Zafman LLP

(57) ABSTRACT

An electronic device is configured to manage heat in the device using a multi level thermal management process. When the temperature of the device reaches a level that requires the device to take action to adjust its thermal behavior, a system level controller identifies a component in the device as being active and that can be controlled to adjust heat generation in the device. Once an active component is identified, a component level controller sets an activity limit for the identified active component that is at or above a minimum activity limit of the component and prevents the component from operating above this activity limit. Other embodiments are also described and claimed.

26 Claims, 10 Drawing Sheets

(56) References Cited

U.S. PATENT DOCUMENTS

2012/0179303 A1* 7/2012 Anderson et al. ............. 700/299
2012/0272086 A1* 10/2012 Anderson et al. ............. 713/340

OTHER PUBLICATIONS

Kaya I, "Improving performance using cascade control and a Smith predictor", ISA Transactions, Instrument Society of America. Pittsburgh, US, vol. 40, No. 3, Jul. 1, 2001, pp. 223-224, XP004255751, ISSN: 0019-0578, DOI: 10.1016/S0019-0578(00)00054-9, p. 223-p. 225; figure 1.

International Preliminary Report on Patentability (Chapter I) for corresponding International Application No. PCT/US2012/037577, mailing date Dec. 12, 2013, 10 pages.

KIPO's Notice of Preliminary Rejection (dated Dec. 31, 2014), Application No. 10-2013-7033229, Date Filed: May 11, 2012, (8 pages).

* cited by examiner

MULTI-LEVEL THERMAL MANAGEMENT IN AN ELECTRONIC DEVICE

BACKGROUND

Consumers' appetite for more performance and functionality from a small form factor, multi function computing device, such as a smart phone, a tablet computer, or a laptop notebook computer, typically outpaces developments in low power consumption electronics. Thus, manufacturers of such devices are forced to find better ways of coping with high temperature effects (thermals) while trying to maintain a desired performance level for the user. A given device may include more than one source of heat that individually, or in concert with others, causes a temperature of the device to rise above a desired maximum temperature. Furthermore, heat may come from outside of the device when, for example, the device is being used in a hot room or in direct sunlight. To resolve thermal issues, several proactive measures have been developed including reducing the speed or power supply voltage at which a constituent processor of the device is running, engaging cooling fans, lowering a cellular network RF transmit power limit, or dimming a display. Many devices designed today require these proactive measures to provide adequate performance in order to not frustrate the user's experience with the device, under various thermal conditions.

An example thermal arena to monitor and manage in a device is the device's external case temperature. This should be kept in a predefined range, e.g., as specified by Underwriters Laboratories (UL) for consumer grade cellular telephone handsets. During normal operation, the external case of the device should not become so warm as to become uncomfortable for the user to continuously touch during use, e.g., while it is being held in the user's hand or against the user's ear. The external case may be heated by any power consumed within the device, and the hottest points on the external case will most likely be in proximity to the component having the highest power dissipation. Such components include for instance an RF power amplifier (PA), that drives a cellular network RF communications antenna, and an applications processor, both in a mobile telephone or smart phone.

SUMMARY

An embodiment of the invention is a process running in an electronic device for managing the thermal behavior of the device during in the field use. The process includes at least two levels of control. In the first level, the process determines whether a temperature of the device has reached a high enough level that requires it to take action to adjust how much heat is generated. If the temperature has reached this level, the process identifies an active component, from amongst two or more components in the device, that can be controlled to modify its thermal behavior. To identify the active component, the process determines which component of the device should be regulated to effectively manage the thermal behavior of the device while also meeting user performance expectations. When an active component is identified, a second level of control sets an activity limit for the active component that is at or above a minimum activity limit of the component, and prevents the component from operating above this activity limit. In this way, a significant change in heat generation may be achieved, without significantly impacting the user's experience with the device.

In another embodiment, an electronic device has a system level control and a component level control. When a temperature in the device has reached a high enough level, the system level control identifies an active component, from amongst two or more components in the device, that can be controlled to adjust how much heat is generated. The system controller identifies an active component by evaluating the components in the device to identify a component that is enabled and operating above a predefined minimum performance level of the component. Upon identifying an active component, the system level control sends a request to a component level control of the active component to adjust the component's thermal loading index. The component level control responds to the request by taking an action that modifies the component's performance, which in effect modifies the component's contribution to an overall thermal load of the device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well known circuits, structures, and techniques have not been shown in detail so as not to obscure the understanding of this description.

An embodiment of the invention is directed to a multi level thermal management process running in a multi function consumer electronic mobile device, to manage the device's own thermal behavior without significantly impacting the user experience. The thermal management processes described here are not limited to managing the temperature of external cases, but are applicable to managing the temperature of other components or locations of the multi function device. Furthermore, the processes described here may be used to manage the temperature of components and locations of the device in the presence of a heat source that is outside of the device, for example, heat from being in a hot room or direct sunlight.

Figure 1:
FIG. 1 shows a human user holding different types of multi function mobile devices, namely a smart phone and a handheld tablet like personal computer.

FIG. 1 shows a human user holding different types of a multi function mobile device referred to here as a personal mobile device 2. In one instance, the mobile device 2 is a smart phone or a multi function cellular phone with several features typically available in such modern devices, such as a touch screen interface, music and video file recording and playback, digital camera, video games, and wireless enabled applications such as voiceover Internet protocol telephony, electronic calendar, web browser, and email. In another instance, the mobile device 2 may be a larger, handheld tablet like computer. In another instance, the mobile device 2 may be a laptop or notebook computer.

Figure 2:
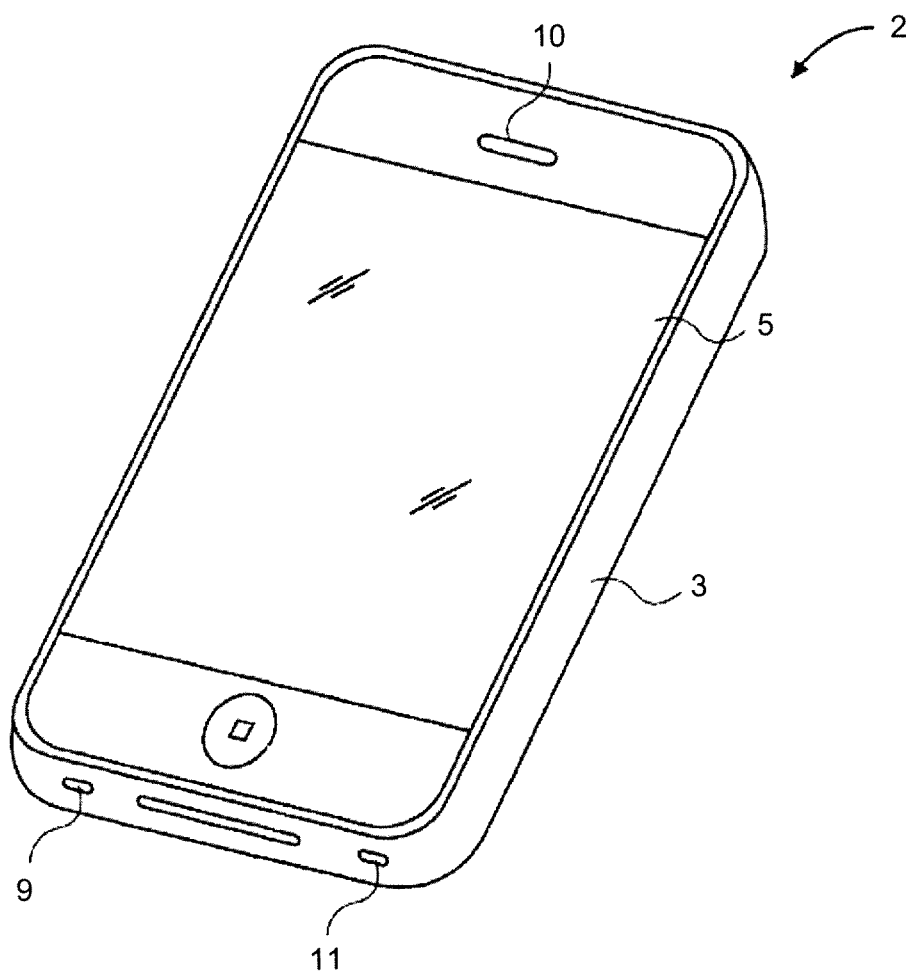
FIG. 2 is an external elevation view of an example multi function mobile device in which a thermal management process in accordance with an embodiment of the invention can be running.
Figure 3:
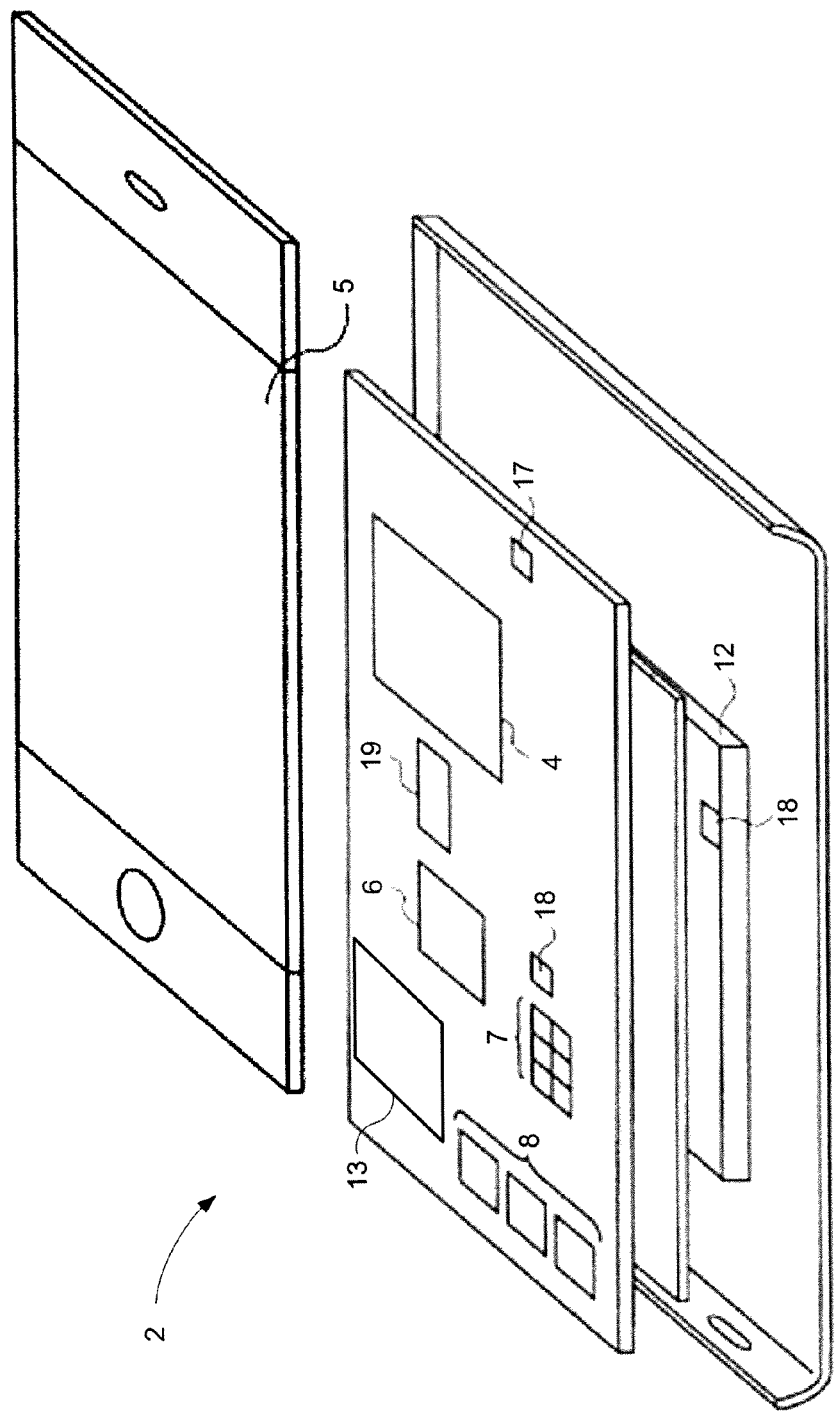
FIG. 3 is an internal view of different layers of components within an example multi function mobile device.

FIG. 2 is an external view of an example personal mobile device 2, while FIG. 3 shows a few components of interest by revealing several layers that make up the device 2. Again, this is merely an example of the personal mobile device 2. Other component topologies are possible, e.g., one that does not have cellular network communications capability but relies instead on wireless voice over internet protocols for telephony, using built in wireless local area network components. Briefly, the device 2 has within its external case or housing 3 the following components that operate together to provide cellular phone, web surfing, and digital media playback functions to its user: an applications processor or CPU 4, a graphical processing unit (GPU) 13, a touch sensitive display screen 5 with a built in backlight, a cellular baseband processor 6, cellular network RF transceiver power amplifiers 7, 8, microphone 9, receiver (ear speaker) 10, speaker 11, and, of course, a rechargeable battery 12. Note that the display screen 5 need not be touch sensitive; instead, user input may be had through a separate, built in, physical keyboard or keypad (not shown).

There may be several temperature sensors, including a board temperature sensor 17 located near an edge of the motherboard or baseboard, an RF temperature sensor 18 located closer to the power amplifiers 7, 8, and a battery temperature sensor 18 located close to the battery 12. Additional temp sensors may be included, such as one that is associated with a Subscriber Identity Module (SIM) card (not shown) or is on chip with the baseband processor 6 in the device 2. A thermal management program, stored in memory 19, may be executed by the applications processor 4 or by another processor within the device, to perform some of the operations described later in this document.

There may be a potential "hotspot" defined at a given location on the outside surface of the housing 3 of the device 2, which may consist of critical points located on the sides and on the back of the housing 3, e.g., the shaded areas where the user is touching the device 2 in FIG. 1. Another possible hotspot is a region on a back face of the housing where the user typically holds the device 2 in a telephone handset configuration against her ear, during a call. Note that a hotspot may be represented by a virtual temperature variable since there may be no temperature sensor that is sufficiently close to the given location. Details on how to compute such a virtual temperature can be found in commonly assigned U.S. Publication No. 2010/0094582 entitled "Method for Estimating Temperature at a Critical Point."

A multi level thermal management process according to an embodiment of the invention will now be described, beginning with a discussion of a system's thermal load. An entire system may be under considerable thermal load, i.e., the amount of heat in a device is considered "high," but only some of the components of the system may be contributing to that load. The amount of power dissipated by a given component can be thought of as the thermal load it puts on the overall system. The term "loading index" is used here to describe the thermal load of a component. There may be several types of loading index used in the thermal management process. The thermal loading index of a component may be determined from its power consumption, measured temperature, duty cycle, or a loading index of another component.

A component's contribution to the total thermal load may be given as the percentage of maximum power the component can dissipate. In this case, the loading index of the component may be calculated as Loading Index (LI)=Current Power/Max Power.

When power cannot be measured, which is true for most of the components in the system, temperature may be used. The loading index of a component may be determined as a function of a measured temperature of the component or relative to a measured temperature in the device that is outside of the component. The thermal model may use temperature sensors to determine a temperature for a component. For example, multiple temperature sensors can be built into the device, and then calibrated before use. These may be in contact with or located near their respective components to be monitored. For components that do not have a temperature sensor, sensors near the component may be used to measure temperature, and the temperature of the component may then be calculated based on the readings from those sensors and known properties of the intermediate materials. Temperature readings are "sensed" by such sensors, e.g., by passing a known current through a thermistor during normal operation of the device, measuring its voltage and calculating its resistance. In another embodiment, the thermal model may determine a temperature for a component through a PID (proportion, integral, and derivative) controller.

The maximum power a component can dissipate may be set based on either the maximum temperature the component can tolerate, or based on a set limit. For example, if the temperature of a system on chip (SoC) is recording 90 degrees Celcius (C) and the limit is 105 C, then its loading index will be high. For this case, it might be suitable to have a static table for the mapping of the temperature to the loading index or a simple linear mapping may be used. The table below is an example of a mapping for a SoC using a table.

TABLE 1

| Temperature (Celcius) | Loading Index (Percent) |
| --- | --- |
| 50 | 30 |
| 55 | 40 |
| 60 | 50 |
| 70 | 70 |
| 90 | 80 |
| 100 | 100 |

For components where the power and temperature cannot be measured, such as a GPU, the loading index can be calculated as Loading Index (LI)=Averaged duty cycle/Max duty cycle where the average duty cycle is calculated over some time constant.

The loading index may be applied from one component to another. This can be thought of as the thermal dissipation from one component being forced into another. For example, the SoC may be heating a NAND flash, which itself must be monitored even though there is no thermal mitigation to the NAND flash itself. This loading index can be calculated as a function of the loading index of the contributing component. The loading index of a given component, or a series of components, may be calculated for a regional (e.g., a hotspot location) or a system wide loading index.

Figure 4:
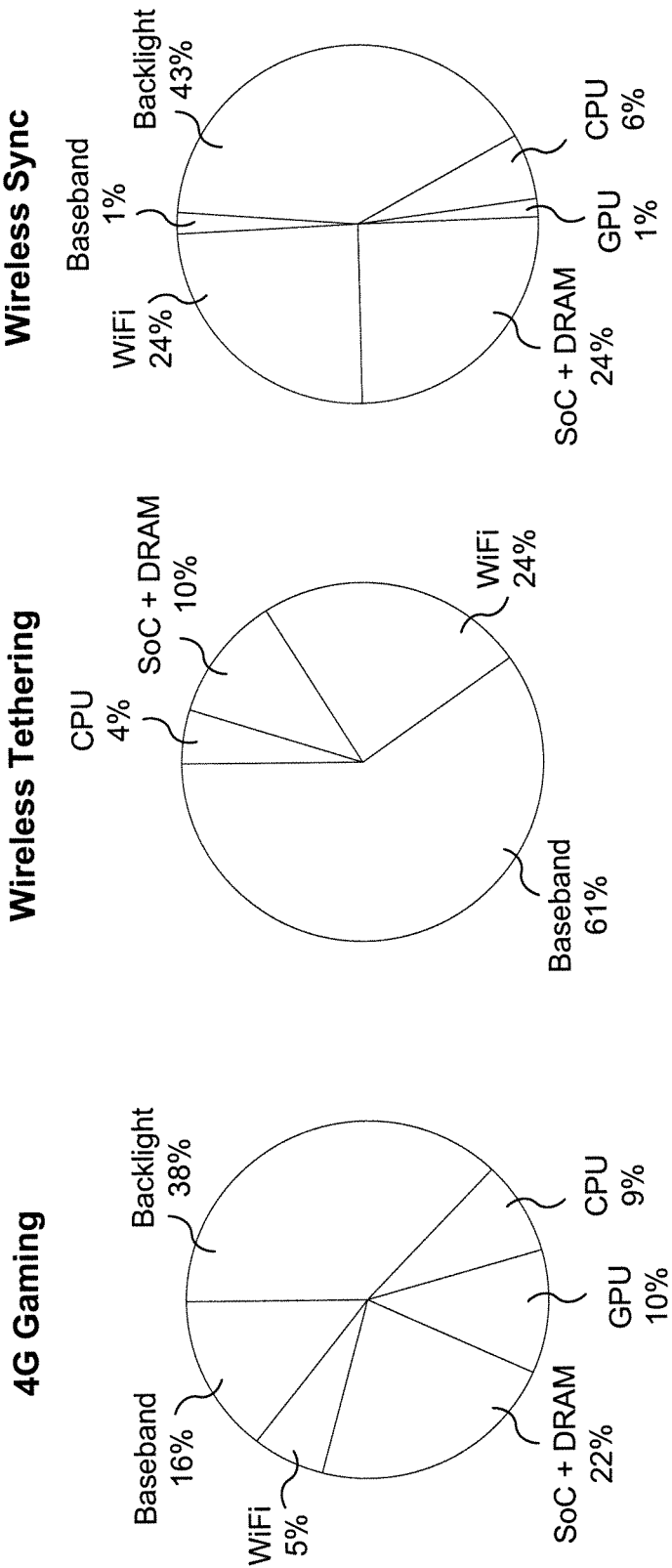
FIG. 4 shows several charts of power distribution amongst components in a mobile device during various example thermal situations.

FIG. 4 shows several charts of power distribution amongst components in a device during various example thermal situations. Each situation may result in a very high overall system power, but very different component level workloads. The total system power may be spread over a number of components, some of which are highly loaded and others which are not. For example, when the device is being used for online gaming using a mobile communications protocol such as 4G, the power consumed by the backlight may be 38% of the total system power, while the power consumed by the CPU may be 9% of the total system power. In contrast, when the device is used for wireless tethering to share its internet connection with another device, the display may not be on and so the backlight would not be using any of the total system power. The baseband processor, however, may be consuming 61% of the total system power, while the power consumption of the CPU may be only 4%. Another example thermal situation showing how the total system power may be spread over a number of components is when the device is wirelessly syncing with another device over a WiFi connection.

Figure 5:
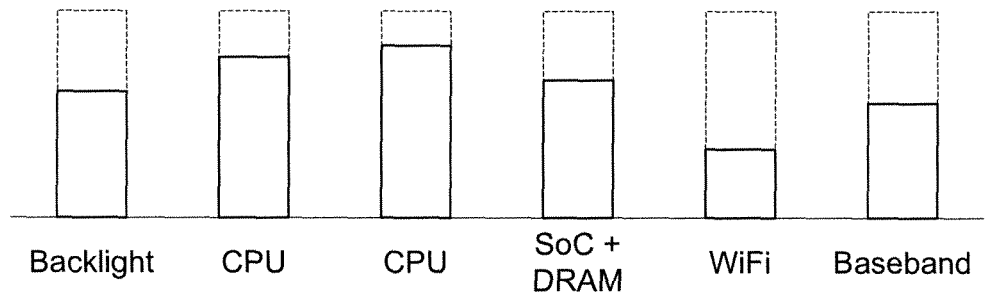
FIG. 5 shows several charts comparing a loading index of each component in an example mobile device during various example thermal situations.
Figure 5:
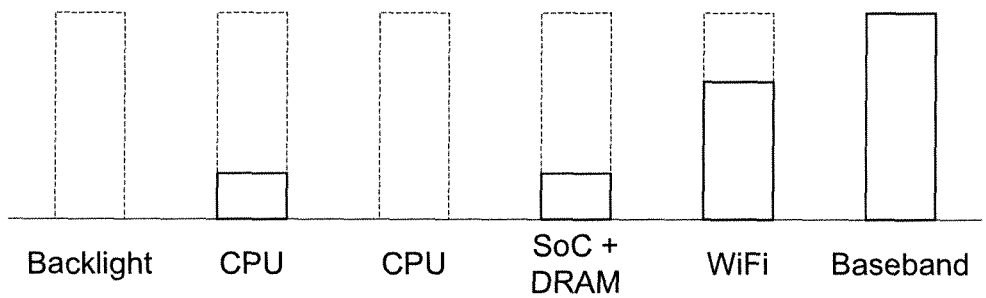
Figure 5:
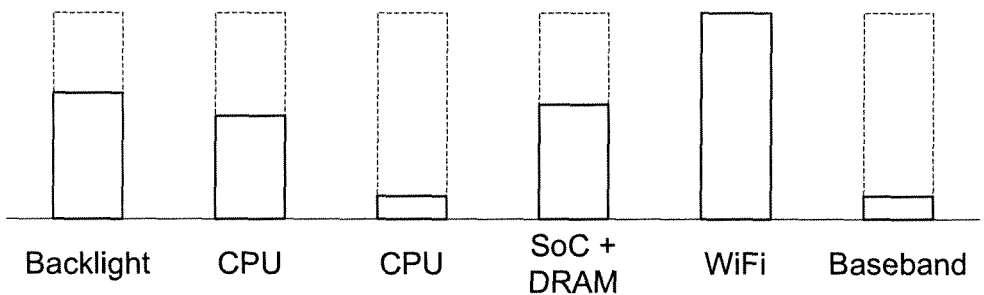

FIG. 5 includes several charts comparing each component's loading index during various example thermal situations. As described above, the loading index is used to quantify the power coming from each component. The loading index of each individual component of the system contributes to an overall loading index on the system, which may represent a wide range in thermal load depending on the situation. By modeling the loading index on each component separately, the thermal management process can determine the best thermal mitigation action to take for a given situation. For example, during the 4G gaming scenario, the thermal management process may determine that the CPU has the highest loading index and thus throttling the CPU may be the best action to take to reduce the system's thermal load. In contrast, the thermal management process may decide to throttle the baseband processor during wireless tethering or the WiFi transceiver during wireless sync, because these are the components with the highest loading index for those scenarios. The throttles limit the maximum power which can be consumed by the components, which limits the rate at which the temperature can rise. The throttle settings may correspond to different settings of performance levels or different operating settings.

Figure 6:
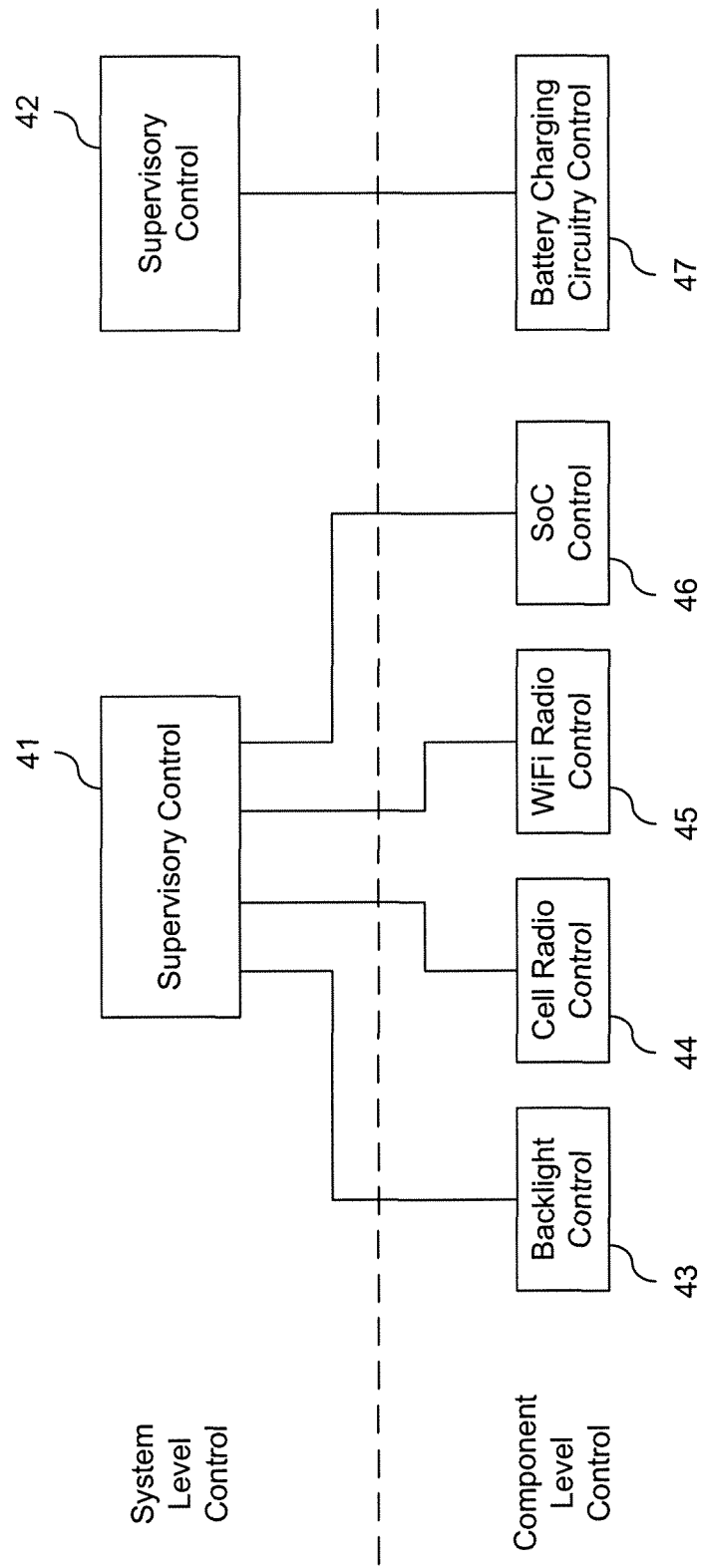
FIG. 6 is a block diagram of a two level control system of a thermal management process in accordance with an embodiment of the invention.

To support a multi level model of thermal management while also maintaining an overall system control, two levels of control may be used. Referring to FIG. 6, the first level may be a system level control (also referred to as a supervisory control), and the second level may be a component control (also referred to as an autonomous control). There may be multiple control systems at each level. For example, the system may be divided into multiple hotspot locations, and a supervisory control may be implemented for thermal management of each hotspot location. For a hotspot location, a component control may be implemented for each component near the hotspot location. If there is more than one supervisory control (e.g., supervisory controls 41 and 42), they may both run simultaneously and may be triggered by an increase or decrease of the loading index of the system (or of a hotspot location). A supervisory control may reduce the performance (or performance capability) of the device when the representative temperature rises above a predetermined threshold, and increase the performance (or allow the performance capability to increase) when the representative temperature drops below a predetermined threshold. Each of the autonomous controls (e.g., backlight control 43, cell radio control 44, WiFi radio control 45, SoC control 46, and battery charging circuitry control 47) may operate independently and may each take simultaneous action to modify the thermal loading on the system. The autonomous controls are run as a result of decisions made by the supervisory controls.

The supervisory controls make decisions based on a relatively long time constant, e.g., updating their decisions every handful of seconds, while a component control time constant may be shorter than that of its supervisory control. A supervisory control may sample the temperature or loading index of the system at a predetermined frequency, e.g., every few seconds, during in the field use of the device to regulate the representative temperature of the device, e.g., continuously while the device is not in sleep mode. A component control may sample a loading index of a component that it is controlling at a faster rate than the supervisory controls, to regulate the temperature of the component.

Figure 7:
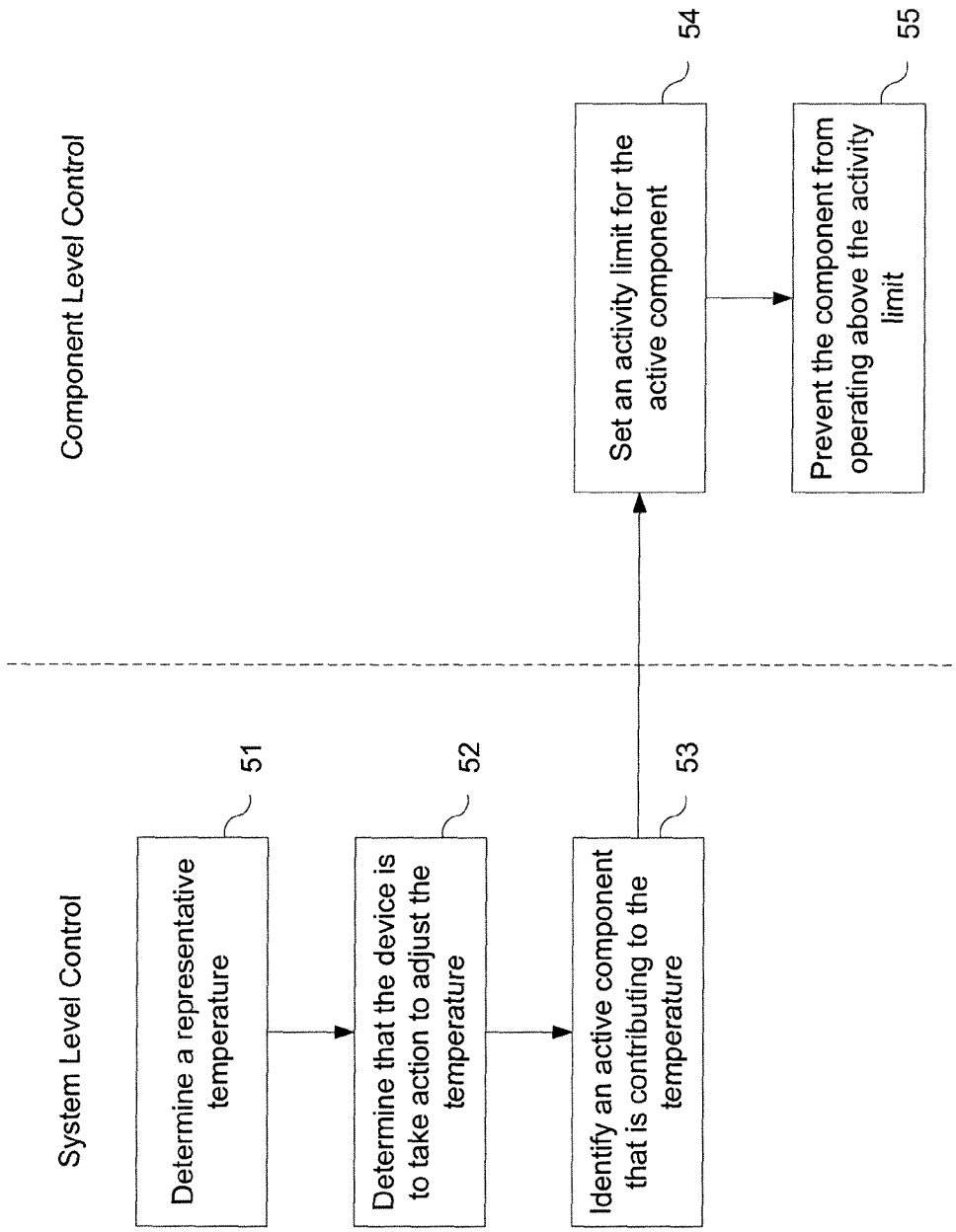
FIG. 7 is a flow diagram of a thermal management process in accordance with an embodiment of the invention.

FIG. 7 is a flow chart of an example thermal management process that may utilize a supervisory control and a component control. The process begins with the supervisory control determining a representative temperature of the device or of a hotspot location (block 51). The representative temperature may be determined based on the loading index of one or more components at or near the target location. The supervisory control then determines that the representative temperature requires the device to take action to adjust heat generation in the device (block 52). There may be predefined threshold temperature values (which may refer to threshold regional loading index values) that may trigger the supervisory control to take action to adjust the heat generation. For example, when the representative temperature reaches a threshold value, the supervisory control may then take action to decrease the thermal output of the device so as to regulate the representative temperature. Similarly, when the representative temperature falls below a threshold value, the supervisory control may partially or completely reverse any actions that were previously taken to decrease the thermal output of the device.

In response to determining that the representative temperature requires the device to take action, the supervisory control then proceeds to identify a component at or near the target location that is active and that is contributing to the heat generation in the device (block 53). When identifying a component to control, the supervisory control may determine whether the component is enabled or whether the component is operating in a high power consumption rate. This may include, but is not limited to, determining whether a display screen backlight is enabled, whether a cellular network transceiver is enabled, whether a battery charging circuit is enabled, whether a GPU is enabled, or whether a CPU is operating in a high power consumption state. The supervisory control may consider whether it is possible to control the component so as to reduce the thermal load at the target location, but without significantly impacting the user's experience with the device. For example, the supervisory control may access previously stored data to determine whether the component has previously been limited to operate at a minimum loading index for the component which corresponds to a minimum performance level of the component. In that case, the conclusion may be that component cannot be further controlled without significantly impacting the user's experience with the device. As another example, the supervisory control may determine whether the component is already operating at its minimum loading index, in which case further limiting the activity of the component will not significantly affect the heat generation in the device. Example supervisory controls are discussed in more detail below with reference to FIG. 8 and FIG. 9.

Upon identifying a component that can be controlled to adjust the heat generation in the device, the supervisory control sends a request to a component control of the identified component to reduce the component's loading index. In response to receiving the request from the supervisory control, the component control may take action to reduce the component's loading index. To reduce the component's loading index, the component control may reduce the power consumption of the component by a fixed increment, while the component is operating above its minimum performance level. Additionally or alternatively, the component control may set an activity limit for the component (block 54), which limits the maximum power which can be consumed by the component and the rate at which the temperature can rise. The component is then prevented from operating above the activity limit (block 55). When setting the activity limit for the component, the component control may determine whether an activity limit has been previously set for the component, and whether this current activity limit is above a minimum activity limit for the component which corresponds to the minimum performance level of the component. If the current activity limit is above the minimum activity limit, the component control may set a new (lower) activity limit for the component that is at or above the minimum activity limit. If the current activity limit is at the minimum activity limit, the component control cannot set a new activity limit that is below the minimum activity limit because this will significantly impact the user's experience with the device. In this case, the component is already operating at its minimum performance level. An example component control is discussed in more detail below with reference to FIG. 10.

To make decisions in a dynamic fashion, the supervisory control may use a rule driven system. Each supervisory control may include a decision tree which provides a series of rules by which thermal loading can be alleviated. If multiple supervisory controls are simultaneously running, a decision made by each supervisory control may result in multiple actions being taken, or just one action being taken. In the case where no action is possible, the device may head towards critical thermal loading and risk being shut down.

Figure 8:
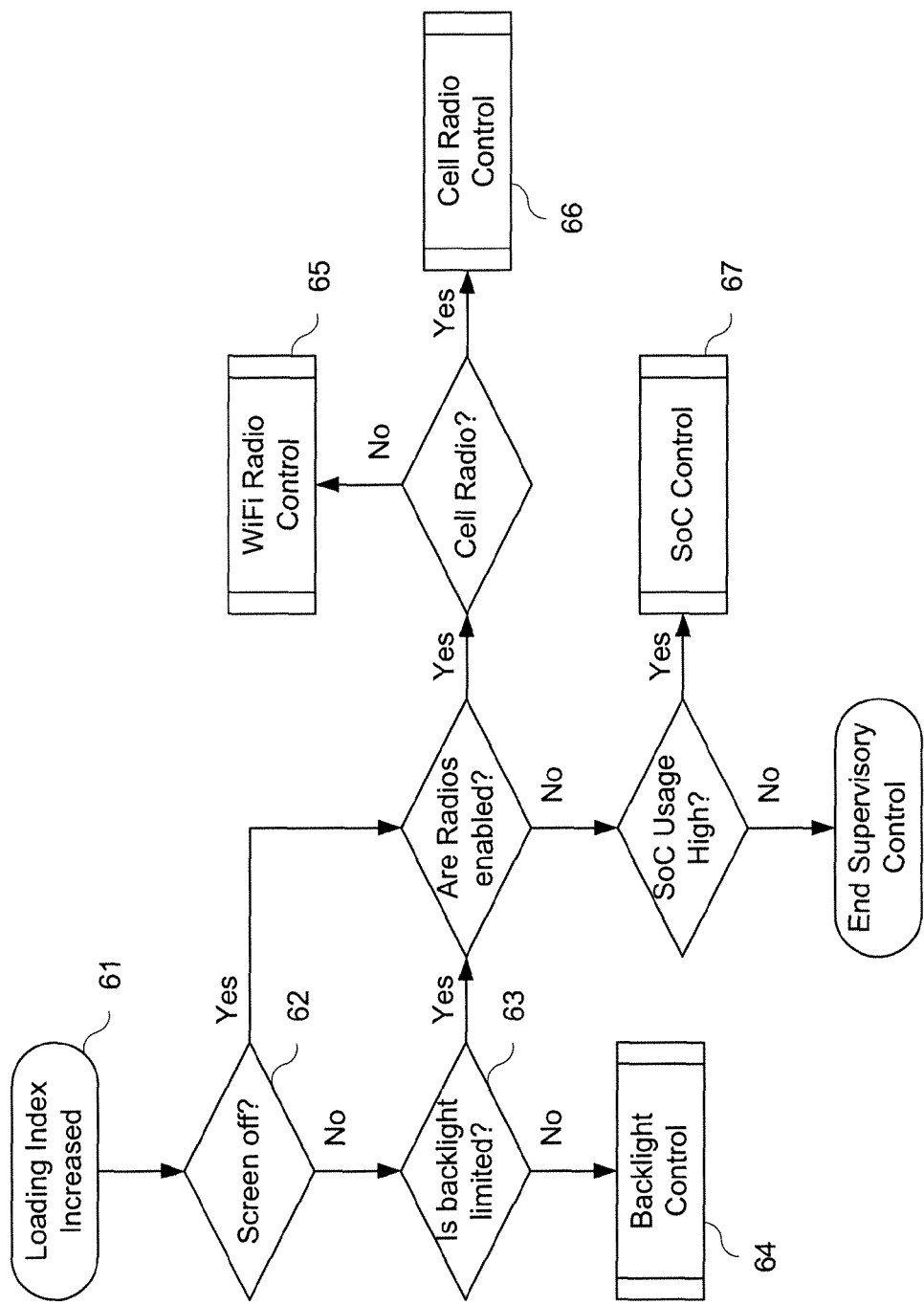
FIG. 8 is an example decision tree utilized by a system level control.

FIG. 8 shows an example decision tree of a supervisory control (e.g., supervisory control 41 of FIG. 6) that may be used to determine what action to take to alleviate the thermal loading at a hotspot location of the device. At block 61, the supervisory control detects that the regional loading index has increased, which indicates an increase in temperature at the hotspot location. The supervisory control may then proceed to identify a component that is enabled and that may be controlled to reduce the thermal load at the hotspot location. The supervisory control may first determine whether the display screen is off or on (block 62). If the display screen is on, the supervisory control determines whether the light output of the display screen backlight can be controlled to reduce the thermal load, without significantly impacting the user's experience with the device. For example, the supervisory control may determine whether the backlight has been previously limited (block 63) or whether the backlight power has already been set to a minimum acceptable level. If the supervisory control determines that the backlight intensity can be reduced, the supervisory control may send a request to the backlight component control to reduce the light output of the backlight (block 64), to in effect reduce its loading index and its temperature. The actual control and decisions of the backlight control system are not shown in this decision tree, as it is handled by the component control for the backlight (see FIG. 10). Each component that can help reduce the thermal load will have its own component control system to reduce power. In doing so, each component control does not need to be aware of the overall loading index of the system.

In the example decision tree of FIG. 8, the backlight output may be reduced only in a condition under which the screen is on. Otherwise, when the screen is off, other thermal mitigations are considered. Example use cases where other thermal mitigation options would be required are when the device is being used for wireless tethering, as shown in FIG. 4 and FIG. 5, or when the device is playing video to an external screen, with both the display screen and the backlight turned off. In these cases, it is possible for the device to reach high thermal levels, and limiting the backlight intensity would not improve the thermal situation of the device and may cause the device to reach higher thermal levels. In a dynamic system as described here however, the backlight limiting would not have been engaged as the backlight and display was not active. In the case where the backlight is not enabled, the supervisory control may look for other ways to reduce the thermal load, such as through WiFi radio control (block 65), cell radio control (block 66), or SoC control (block 67).

Figure 9:
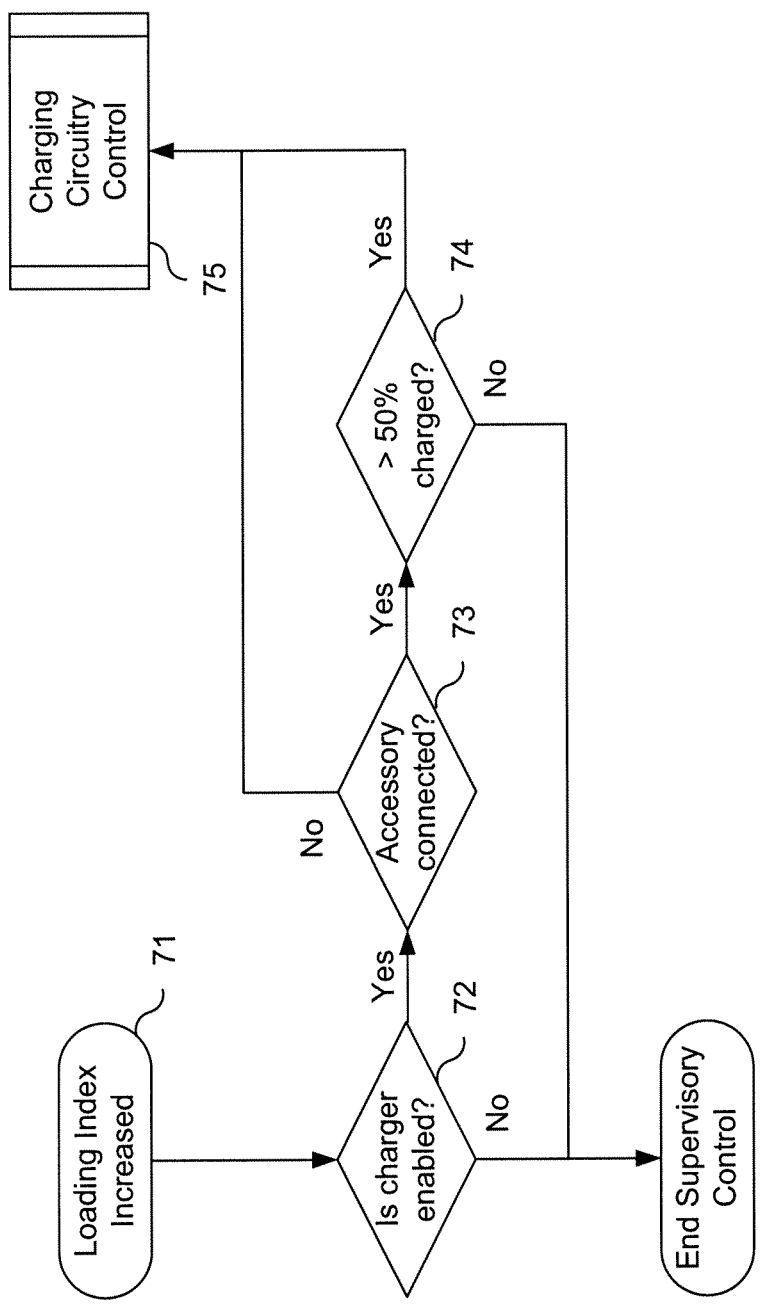
FIG. 9 is another example decision tree utilized by a system level control.

FIG. 9 is an example of another supervisory control (e.g., supervisory control 42 of FIG. 6) that may run at the same time as the supervisory control shown in FIG. 8. When the supervisory control detects an increase in the system's loading index (i.e., an increase in the temperature of the device) (block 71), the supervisory control may use this example decision tree to determine whether the battery charging circuitry may be controlled to reduce the thermal load, without significantly impacting the user's experience with the device. In making this determination, the supervisory control may consider factors such as whether the charger is enabled (block 72), whether an accessory is connected to the device (block 73), and whether the battery is at least half charged (block 74). If the supervisory control determines that the battery charging circuitry can be controlled, the supervisory control may then send a request to the charging circuitry component control to limit a charge rate for the battery (block 75).

Each component control may be defined to handle a request from a supervisory control to reduce its component's loading index. For example, the backlight component control may be a simple model where the backlight level is reduced, stepping down in fixed increments, in response to each request from the supervisory control. The backlight component control may be defined to handle a solar scenario, where a high backlight level is required for the user to still be able to see what is being displayed by the display screen. The backlight component control may query another component or control system of the device, such as an ambient light sensor or the supervisory control, to determine whether a solar scenario is present.

Figure 10:
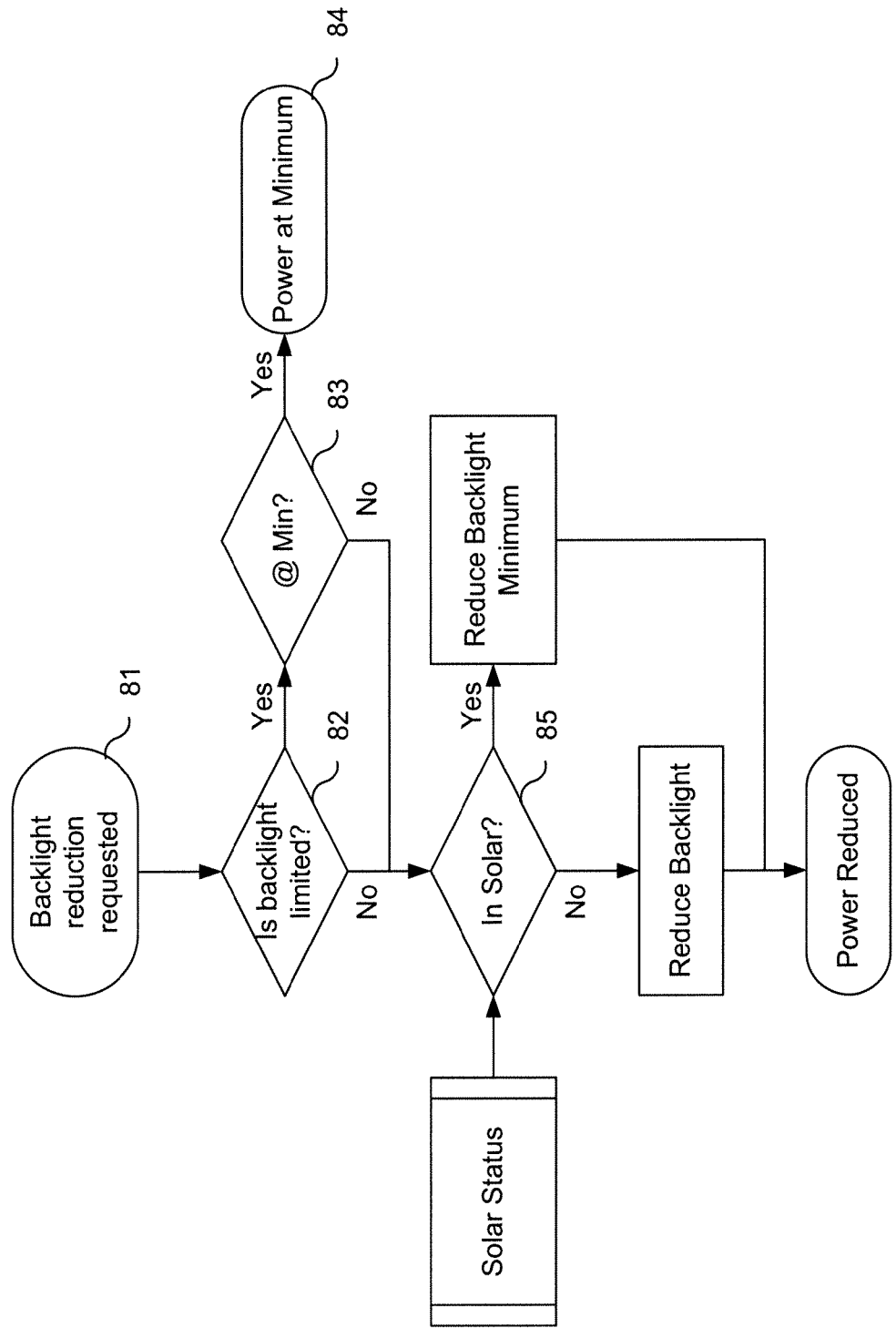
FIG. 10 is an example decision tree utilized by a component level control.

FIG. 10 shows an example backlight component control using a decision tree. When the backlight component control receives a request from the supervisory control to reduce the light output of the backlight (block 81), the backlight component control may determine whether the backlight has been previously limited (block 82) and whether this limit is at a minimum acceptable level (block 83). If the backlight has previously been limited to the minimum acceptable level, then the backlight cannot be reduced further without significantly impacting the user's experience with the device. In this case, the power of the backlight is considered to be at a minimum level (block 84), and the backlight component control process ends. If the backlight intensity can be further reduced, the backlight component control may consider whether a solar scenario, i.e., whether the device is being used in an environment with high ambient lighting, is present (block 85) to determine whether to reduce or limit the light output of the backlight.

In addition to the backlight, there are other heat generating components of the device 2 that may be automatically controlled, to efficiently improve the thermal behavior of the different arenas (for example, the external case) of the device 2. These components may be throttled to prevent them from getting too hot. One component that may be automatically controlled is the cellular network RF transceiver power amplifier whose output RF power can be limited so as to override a contrary request from the cellular base station. Another component or function in the device 2 that may be commanded to drop its power consumption is the transmit rate of the cellular network transceiver (or the WiFi transceiver). For example, the device may have third generation, 3G, cellular network communications hardware and software that enable its user to surf the Web, check email, and download video at greater speeds. In that case, the device may reduce its 3G, High Speed Downlink Packet Access, HSDPA, transmit rate, its data upload and download rates, or limit its RF output power in response to a thermal event. The RF output power may be limited by throttling the duty cycle of the cellular network transceiver.

The CPU may be controlled to work under different core voltages and core frequencies. Using a high core voltage and a high core frequency, the CPU can be optimized for computation with high power consumption. Using a low core voltage and a low frequency, the CPU can be optimized for battery performance at a degraded computation performance level. The throttle settings can be dynamically arranged so that the temperature to be controlled does not rise beyond the system's limits. The GPU may be similarly controlled to limit its average duty cycle.

A battery charging circuit may be controlled to limit the rate at which electric current is added to the battery (also referred to as the charge rate). The battery charging circuit may adjust the charge rate depending on the temperature. The battery charging circuit may stop charging the battery in response to a thermal event, and re enable charging when the temperature drops below a specified level.

While each component may be able to limit its loading index to help relieve the system's thermal load, user performance expectations must also be met. To accommodate this, a minimum loading index (and a corresponding minimum activity limit) for each component must be defined. For example, CPU utilization can be throttled, but going below 50% might degrade user performance. In this case, the default lower limit for the CPU component control may be set to 50% of the maximum loading for the CPU.

When the loading index of the system decreases, the supervisory controls may be used to remove the activity limits on the components and to make requests to component controls. Each component control may then slightly raise or completely remove the activity limit previously set for the component. If the loading index of the system reaches a sufficiently low value, a broadcast style notification may be sent to all component controls to remove all remaining activity limits that were not released directly by the supervisory controls.

To conclude, various aspects of a technique for dynamically managing the thermal behavior of a multi function consumer electronic device during in the field use is described. As explained above, an embodiment of the invention may be a machine readable medium having stored thereon instructions which program a processor to perform some of the digital signal processing operations described above including, for example, the functions of the supervisory controls and the component controls. A machine readable medium may include any mechanism for storing or transferring information in a form readable by a machine (e.g., a computer), such as Compact Disc Read Only Memory (CD ROMs), Read Only Memory (ROMs), Random Access Memory (RAM), and Erasable Programmable Read Only Memory (EPROM). In other embodiments, some of these operations might be performed by specific hardware components that contain hardwired logic. Those operations might alternatively be performed by any combination of programmed data processing components and fixed hardware circuit components.

For purposes of explanation, specific embodiments of the invention have been described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, the device 2 depicted in FIG. 1 may be a mobile telephony device (e.g., a smart phone handset) or it may be a desktop personal computer. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A method for thermal management of an electronic device having a plurality of components, comprising:
   determining a representative temperature of the device;
   determining that the representative temperature requires the device to take action to adjust heat generation in the device;
   identifying one of the plurality of components as being active and that can be controlled to adjust heat generation in the device;
   accessing previously stored data to determine a predefined minimum level of activity for the identified active component;
   setting an activity limit for the identified active component that is at or above the predefined minimum level of activity for the identified active component; and
   preventing the identified active component from operating above the activity limit.

2. The method of claim 1, wherein determining the representative temperature of the device, comprises:
- determining a loading index of each component in the device; and
- determining the representative temperature of the device based on the loading index of each component.

3. The method of claim 2, wherein determining the loading index of a component comprises one of:
- calculating the loading index as a current power of the component divided by the maximum power the component can dissipate;
- determining the loading index of the component as a function of a measured temperature of the component;
- determining the loading index of the component relative to a measured temperature in the device outside of the component;
- determining the loading index of the component using a proportional integral derivative controller;
- calculating an average duty cycle of the component over a predetermined time constant and calculating the loading index as the averaged duty cycle divided by the maximum duty cycle of the component; and
- determining the loading index of the component as a function of a loading index of another component.

4. The method of claim 1, wherein identifying one of the plurality of components as being active comprises at least one of:
- determining that a display screen backlight is enabled;
- determining that a cellular network transceiver is enabled;
- determining that a battery charging circuit is enabled;
- determining that a graphical processing unit is enabled; and
- determining that a central processing unit is operating in a high power consumption state.

5. The method of claim 1, wherein identifying one of the plurality of components that can be controlled to adjust heat generation in the device comprises:
- determining that the identified active component is operating above a predefined minimum performance level of the identified active component.

6. The method of claim 1, wherein setting an activity limit for the identified active component further comprises:
- determining that a current activity limit of the identified active component is above the predefined minimum level of activity for the identified active component; and
- setting a new activity limit for the identified active component that is at or above the predefined minimum level of activity,
- wherein the predefined minimum level of activity corresponds to a minimum performance level of the identified active component for maintaining user experience with the electronic device.

7. The method of claim 1, wherein the identified active component is a display screen backlight and preventing the identified active component from operating above the activity limit comprises:
- limiting light output of the display screen backlight to a level that is indicated by the activity limit.

8. The method of claim 1, wherein the identified active component is a cellular network transceiver and preventing the identified active component from operating above the activity limit comprises:
- limiting RF transmit power of the cellular network transceiver to a level that is indicated by the activity limit.

9. The method of claim 1, wherein the identified active component is a battery charging circuit and preventing the identified active component from operating above the activity limit comprises:
- limiting a charge rate of the battery charging circuit to a level that is indicated by the activity limit.

10. The method of claim 1, wherein the identified active component is a graphical processing unit and preventing the identified active component from operating above the activity limit comprises:
- limiting average duty cycle of the graphical processing unit to a level that is indicated by the activity limit.

11. The method of claim 1, wherein the identified active component is a central processing unit and preventing the identified active component from operating above the activity limit comprises:
- limiting clock frequency or supply voltage of the central processing unit to a level that is indicated by the activity limit.

12. A method for thermal management of an electronic device having a hotspot location, the hotspot location being near a plurality of components, comprising:
- determining a representative temperature of the hotspot location;
- determining that the representative temperature requires the device to take action to adjust heat generation at the hotspot location;
- identifying one of the plurality of components as being active and that can be controlled to adjust heat generation at the hotspot location;
- accessing previously stored data to determine a predefined minimum level of activity for the identified active component;
- setting an activity limit for the identified active component that is at or above the predefined minimum level of activity for the identified active component; and
- preventing the identified active component from operating above the activity limit.

13. An electronic device, comprising:
- a system controller to identify a component of a plurality of components in the device as being active and that can be controlled to adjust a system thermal loading index; and
- a component controller of the identified active component to respond to a request from the system controller to modify a thermal loading index of the identified active component, wherein the system controller or the component controller is to access previously stored data to determine a predefined minimum level of activity for the identified active component,
  - and wherein the component controller modifies the thermal loading index by setting an activity limit for the identified active component that is at or above the predefined minimum level of activity for the identified active component, and prevents the identified active component from operating above the activity limit.

14. The device of claim 13, wherein the system controller is to identify a component as being active by evaluating the plurality of components to identify a component of the plurality of components that is enabled and that is operating above a predefined minimum performance level of the component.

15. The device of claim 13, wherein the system thermal loading index is a function of a thermal loading index of each component of the plurality of components.

16. The device of claim 13, wherein a thermal loading index of a component is based on one of: power consumption of the component, measured temperature of the component, duty cycle of the component, and thermal loading index of another component.

17. The device of claim 13, wherein the system controller continuously samples the system thermal loading index during in-the-field use of the device so as to regulate the system thermal loading index, the system controller to sample the system thermal loading index at a rate that is slower than a rate at which the component controller samples the thermal loading index of the identified active component to regulate the thermal loading index of the identified active component.

18. The device of claim 13, further comprising:
a display screen having a backlight, wherein the identified active component is the backlight and the component controller of the backlight is to respond to the request from the system controller by modifying a brightness limit on the backlight.

19. The device of claim 13, further comprising:
a wireless communications transceiver RF power amplifier, wherein the identified active component is the power amplifier and the component controller of the power amplifier is to respond to the request from the system controller by modifying a RF output power limit on the power amplifier.

20. The device of claim 13, further comprising:
a battery charging circuit, wherein the identified active component is the battery charging circuit and the component controller of the battery charging circuit is to respond to the request from the system controller by modifying a supply voltage limit on the battery charging circuit.

21. The device of claim 13, further comprising:
a graphical processing unit, wherein the identified active component is the graphical processing unit and the component controller of the graphical processing unit is to respond to the request from the system controller by modifying an average duty cycle limit on the graphical processing unit.

22. The device of claim 13, further comprising:
a central processing unit, wherein the identified active component is the central processing unit and the component controller of the central processing unit is to respond to the request from the system controller by modifying a processor clock limit or a supply voltage limit on the central processing unit.

23. An article of manufacture, comprising:
a non-transitory machine-readable medium storing executable instructions which program a processor of a multifunction consumer electronic device to control the thermal behavior of the device based on a representative temperature of the device, wherein the programmed processor is to evaluate a plurality of components to select a component that can be controlled to affect the representative temperature of the device, and adjust performance of the selected component to affect the representative temperature of the device,
wherein the programmed processor accesses previously stored data that includes a predefined minimum level of activity for the selected component and sets an activity limit for the selected component that is at or above the predefined minimum level of activity for the selected component, and prevents the selected component from operating above the activity limit.

24. The article of manufacture of claim 23, wherein the medium stores further instructions which program the processor to determine the representative temperature of the device by computing loading index values for the plurality of components.

25. The article of manufacture of claim 23, wherein the medium stores further instructions which program the processor to adjust performance of the component by reducing performance of the component when the representative temperature is greater than a predefined threshold temperature and increasing performance of the component when the representative temperature is less than the predefined threshold temperature.

26. The article of manufacture of claim 23, wherein the stored instructions program the processor to evaluate the plurality of components by identifying which of the components is enabled and is operating above a predefined minimum performance level.

* * * * *